United States Patent [19]

Desjarlais

[11] Patent Number: 4,775,594

[45] Date of Patent: Oct. 4, 1988

[54] INK JET TRANSPARENCY WITH IMPROVED WETTING PROPERTIES

[75] Inventor: Robert C. Desjarlais, Hadley, Mass.

[73] Assignee: James River Graphics, Inc., South Hadley, Mass.

[21] Appl. No.: 876,682

[22] Filed: Jun. 20, 1986

[51] Int. Cl.[4] ........................ B32B 27/08; B32B 27/36

[52] U.S. Cl. .................................... 428/421; 428/422; 428/480; 428/481; 428/483; 428/500

[58] Field of Search ............... 428/480, 195, 421, 422, 428/207, 424.2; 106/22

[56] References Cited

U.S. PATENT DOCUMENTS

| | | | |
|---|---|---|---|
| 4,446,174 | 5/1984 | Maekawa | 428/207 X |
| 4,474,850 | 10/1984 | Burwasser | 428/480 X |
| 4,503,111 | 3/1985 | Jaeger et al. | 428/480 X |
| 4,528,242 | 7/1985 | Burwasser | 428/480 X |
| 4,555,437 | 11/1985 | Tanck | 428/195 |
| 4,623,689 | 11/1986 | Shintani et al. | 106/22 X |
| 4,642,247 | 2/1987 | Mouri et al. | 428/424.2 |

*Primary Examiner*—Thomas J. Herbert

*Attorney, Agent, or Firm*—Burns, Doane, Swecker & Mathis

[57] ABSTRACT

An ink jet transparency is provided which exhibits improved wetting properties, thereby resulting in an even surface distribution of ink on the transparency. The ink jet transparency comprises a substantially transparent resinous support, e.g., a polyester film, and a substantially clear coating thereon which includes a non-volatile organic acid. Glycolic acid, citric acid, malonic acid, tartaric acid, maleic acid, fumaric acid, malic acid and succinic acid are among the preferred non-volatile organic acids employable in the present invention. The presence of the organic acid results in greatly improved wetting of ink jet ink in solid block areas, preventing the ink from coalescing onto itself. Undesired voids and pin holes in those areas where the ink has been applied are therefore avoided.

14 Claims, No Drawings

INK JET TRANSPARENCY WITH IMPROVED WETTING PROPERTIES

BACKGROUND OF THE INVENTION

1. Field of the Invention

The present invention relates to a recording sheet for use in an ink jet recording process. More specifically, the present invention relates to an improved transparency recording sheet.

2. Description of the Prior Art

Ink jet printing refers to a method of forming type characters on a substrate, e.g., paper, by ejecting ink droplets from a printhead having one or more nozzles. Several schemes are utilized to control the deposition of the ink droplets on the printing substrate or recording sheet to form the desired characters. For example, one method comprises deflecting electrically-charged droplets by electrostatic means. Another method comprises the ejection of single droplets under the control of a piezoelectric device. One type of ink employed is the so-called non-drying type which functions by quickly penetrating the substrate, e.g., paper fibers, thus giving the appearance of being dry to the touch even though still possessing a quantity of relatively low vapor pressure solvent. Another widely used type of ink is the aqueous ink, that is, an ink which is composed of a relatively large quantity of water which functions as the solvent and carrier for the dyes therein.

The image generated by an ink jet printing device may be either in the form of a reflection print wherein the image is deposited on a substantially opaque reflective substrate, e.g., paper, or may comprise a transparency, that is, when the image is formed on a substantially transparent recording substrate and is viewed by illuminating the side of the substrate opposite the image side and viewing from the image side. Such material is, of course, particularly advantageous for use in viewing by projection.

Since projection of a transparency generally involves enlarging of the image, the image quality requirements are more stringent for a transparency than for an image viewed by reflection. Of course a transparency must take into consideration the other problems which may be common to both the transparency and to the reflection image, for example, the water fastness problem of aqueous inks. Moreover, the use of ink jet printing for achieving high speed recording on plastic transparencies has been largely unsuccessful due to the transparent polyester film support repelling the aqueous-miscible ink solutions. As well, the ink tends to coalesce on itself creating unwanted voids on the transparency.

Thus, problems exist in the use of transparencies as to the density of the images, the smear resistance of the ink, as well as an even surface distribution of ink on the transparency so that voids and pin holes do not occur in the ink block areas. U.S. Pat. Nos. 4,474,850; 4,503,111; 4,528,242 and 4,547,405 disclose various ink jet transparencies, some of which overcome the problems of smear resistance. However, severe problems with obtaining an even surface distribution of ink on the transparency so that voids do not occur in the solid ink areas still exist. It would be extremely beneficial to the industry if an ink jet transparency was available which overcame such a problem.

Another problem encountered with some polymer compositions or additives for promoting ink flow is the phenomena of "cracking." Although initially the ink spreads well, upon evaporation of the water from the ink receptive substrate, the substrate shrinks leaving large open cracks in the inked or imaged areas.

Accordingly, it is an object of the present invention to provide an ink jet recording transparency which promotes an even surface distribution of ink on the transparency.

It is another object of the present invention to provide an ink jet recording transparency exhibiting greatly improved wetting of ink jet ink in solid block areas.

Yet another object of the present invention is to provide an ink jet recording transparency exhibiting improved prevention of the ink from coalescing onto itself.

Another object of the present invention is to provide an ink jet transparency which avoids the problems of "cracking."

Still another object of the present invention is to provide an ink jet recording transparency comprising a novel coating layer on the transparent substrate.

These and other objects of the present invention, as well as the scope, nature and utilization of the invention, will be apparent to those skilled in the art from the following description and the claims appended hereto.

SUMMARY OF THE INVENTION

An ink jet transparency exhibiting improved wetting properties is provided. The ink jet transparency comprises a substantially transparent resinous support and a substantially clear coating thereon which includes a non-volatile organic acid. A preferred resinous support is a substantially transparent polyester film, with glycolic acid, citric acid, malonic acid, tartaric acid, malic acid, maleic acid, fumaric acid and succinic acid being among the preferred non-volatile organic acids employable in the present invention.

The presence of the organic acid results in greatly improved wetting of ink jet ink in solid block areas, thus preventing the ink from coalescing onto itself and resulting in an even surface distribution of ink on the transparency. Undesired voids and pin holes in those areas where the ink has been applied are therefore avoided.

DETAILED DESCRIPTION OF THE PREFERRED EMBODIMENTS

The ink jet recording transparency of the invention includes a transparent resin base, which is generally a thermoplastic film, such as a polyester, e.g., polyethylene terephthalate, as marketed under the trademark Mylar 400PB by DuPont, polystyrene, polyvinyl chloride, polymethylmethacrylate, cellulose acetate and the like. A polyester film base is preferred because of its excellent permanency and dimensional stability. The thickness of the resin film base is not restricted to any special range although usually it has a thickness of about to 10 mils.

Polyethylene terephthalate base sheets are relatively hydrophobic, and it can be difficult to apply a water based coating to them. This problem can be overcome in a number of ways. The polyester film itself may be surface treated, e.g., by means of corona discharge, to better accept the coating. A second method is the use of an intermediate coating which has good affinity for both the base film and the surface coating. Gelatin is an example of such a material. Another method is to use a solvent system for the coating that wets the base sheet better than water alone. Alcohol can be included in an aqueous solvent system to achieve the necessary good wetting required to obtain uniform coatings. Either ethanol or methanol is satisfactory. Where a gelatin film is applied from an alcoholic solution, it is necessary to make the solution slightly acidic in order to achieve adequate solubility. A small amount of acetic acid added to the solution can accomplish this purpose.

The coating formulation useful in obtaining a clear coating over the transparent resin base can comprise any conventional resin based coating used in ink jet transparencies, with the addition of an organic acid in accordance with the present invention. For example, among the known coating formulations is a formulation which includes a polymer component comprised of a carboxylated, high molecular weight polymer or copolymer, or salts thereof. Suitable polymers include carboxylated acrylic or methacrylic acid, and esters thereof; carboxylated vinyl acetates; and carboxylated styrenated acrylics. Preferably the molecular weight of the polymer or copolymer ranges from about 50,000 to 1 million. Such polymers provide a clear coating, while being receptive to the ink so as to provide useful recorded images thereon.

The polymer may contain other substituents in addition to carboxyl groups, such as hydroxyl, ester or amino groups, as long as the wettability property of the polymer is retained, and its ionic nature is sufficient to absorb the dye component of the ink.

The carboxyl group of the polymer also may be reacted wholly or partially with a base, such as a high boiling organic amine or an inorganic hydroxide, if necessary, to increase its water solubility. Typical organic amines which may be used for this purpose include methanolamine, ethanolamine and di-and trimethyl and ethanolamine. Inorganic hydroxides include sodium hydroxide, potassium hydroxide and the like.

The foregoing polymer component coating formulation may also contain a polyalkylene glycol component, which is generally polyethylene glycol although other alkylene glycols may be used as well. Preferably, such polyethylene glycols have an average molecular weight of about 5,000 to about 25,000. In a preferred embodiment, wherein high image densities are obtained in an ink jet recording process, the polyethylene glycol compound is made up of two moles of polyethylene glycol of average molecular weight of 8,000 each, which are joined by an epoxide to form a glycol compound with an average molecular weight of 17,500. This glycol is available commercially, for example, as "20M" from Union Carbide Corp.

When using the polyalkylene glycol component, there is a broad suitable range of compositional amounts of polymer and glycol in the coating. This range suitably includes about 5% to 70% of the glycol by weight of the polymer, preferably about 10% to 25%, and optimally, about 20% of glycol by weight of polymer. The best results are achieved when the foregoing compositional amounts are observed.

Another example of a conventional coating formulation is a formulation comprising a coalesced block copolymer latex of polyvinyl alcohol and polyvinyl (benzyl ammonium chloride), alone or with up to 95% by weight of a water-soluble polymer, e.g., polyvinyl alcohol, gelatin or polyethylene oxide.

The coating formulation may also comprise a highly hydrophylic, highly water soluble polymer such as polyvinylpyrrolidone, which is available as a commercial chemical from a number of suppliers. It is preferred that the polyvinylpyrrolidone have a molecular weight of 90,000 or greater, and should not be crosslinked or be only lightly crosslinked so as to not adversely affect its room temperature solubility in water. The polyvinylpyrrolidone can also be used in combination with another matrix polymer such as either gelatin or polyvinyl alcohol.

Generally, since the majority of ink jet inks are of the aqueous type, the polymer composition of an ink jet transparency is important to obtaining large dot sizes and rapid ink drying times. The polymer composition should be water receptive and possess sufficient surface energy to spread the ink drops rapidly to obtain large dots. If the polymer composition is too water receptive the ink droplets will not spread sufficiently and the film will feel tacky during routine handling. Thus, in a preferred embodiment of the present invention, there is used in the coating formulation a combination of a water soluble resin and a water insoluble polymer.

The addition of a water insoluble polymer prevents film tackiness during handling and by reducing water receptivity slightly, allows the ink droplets to spread before ink solvent vehicle absorption takes place.

By carefully balancing the ratios of water soluble to water insoluble resin, plus the use of selected fluorosurfactants such as those disclosed in commonly assigned U.S. Ser. No. 876,448 filed June 20, 1986, now abandoned, an ink jet film is obtained which is free from tackiness or finger printing during handling, exhibits large dot sizes and permits the inks to dry quickly.

Examples of water soluble polymers include polyvinyl pyrrolidone, polyacrylic acid, polyvinyl pyrrolidone/polyvinyl acetate copolymer, polyacrylamides, hydroxyethylcellulose and carboxymethylcellulose. Among the preferred water soluble polymers is polyvinyl pyrrolidone of a molecular weight of 360,000 to about 1,000,000, e.g. that available from GAF under the trademark PVP K-90.

Examples of suitable water insoluble polymers are the highly styrenated acrylics available from Johnson Wax under the JONCRYL trademark, the styrene/allyl alcohol co-polymers available from Monsanto Corp. under the trademarks Monsanto RJ 100, RJ 101 and RF 4506, the nitrocellulose polymer available from Hercules, a carboxylated resin available from B.F. Goodrich under the trademark CARBOSET 525, the polyester resin and polyketone resin available from Khrumbhar Resin under the PRINCE 5130 trademark and KHRUMBHAR K1717 trademark respectively, and the polyvinyl butyral resin available from Monsanto Corp. under the trademark BUTVAR B90. The JONCRYL polymers are among the most preferred for the purposes of the present invention.

To the base coating formulation is added the organic acid of the present invention. The organic acid is preferably a non-volatile organic acid. A volatile organic acid is considered to be one that does not remain in the ink receptive substrate during the film coating/drying process, usually done at temperatures of about 220° F. to 250° F. For example, acetic acid and formic acid are not effective because they boil at 240° F. and 212° F., respectively, which is in the range of the drying ovens. The preferred acids for the present invention are solids at room temperature with melting points ranging from 75° C. to 188° C.

Besides being non-volatile as aforedefined, the organic acid of the present invention should be within one of the following classes:

(i) glycolic acid or methoxy acetic acid;

(ii) a dibasic carboxylic acid having from no more than two, i.e., 0, 1 or 2, methylene bridges between the two carboxy groups, with the methylene bridges being saturated, unsaturated or substituted, for example, with a hydroxy group; and, (iii) a tribasic acid. It has been found that of monobasic acids, only glycolic acid and its methyl ether, i.e., methoxy acetic acid, are effective in the subject invention. Other monobasic acids such as stearic acid have been found to be ineffective. As well, dibasic acids can have no more than 2 methylene bridges between the two carboxy groups, otherwise the organic acid, such as glutaric and adipic acid, are ineffective. The methylene bridges can be unsaturated, such as in maleic and fumaric acid, or substituted such as in tartaric acid. Tribasic non-volatile organic acids have generally been found to be effective for the purposes of the present invention, with citric acid being most preferred.

Specific examples of preferred non-volatile organic acids for use in the present invention include glycolic acid, citric acid, malonic acid, tartaric acid, malic acid, maleic acid, fumaric acid and succinic acid. The most preferred non-volatile organic acid is glycolic acid. Other select organic acids useful in the present invention are methoxy acetic acid, oxalic acid, and 5-sulfosalicylic acid. Generally, inorganic acids and other organic acids such as formic acid and acetic acid have been found to be ineffective for the purposes of the present invention.

The organic acid of the present invention is generally present in the coating formulation in an amount ranging from about 5 to about 40 weight percent based upon the amount of polymer resin component in the formulation, and more preferably from about 10 to about 30 weight percent. Any conventional technique can be employed to effect the coating of the transparency with the coating formulation containing the organic acid.

The clear coating on the transparent support can also include such additives as ultraviolet absorbers, antioxidants, surfactants, humectants, bacteriostats and/or cross-linking agents, if desired.

The thickness of the coatings used herein generally range from about 2–15 microns. Such thicknesses will accommodate dyes of varying concentrations which can be delivered to the transparency at high rates of delivery and with accompanying high dye absorbtivity into the coating.

The presence of the organic acid in the coating of the present invention results in an ink jet transparency which exhibits greatly improved wetting of ink jet ink, thereby preventing the ink from coalescing. The result is an even surface distribution of the ink on the transparency, thereby preventing voids and pin holes in the ink areas, particularly solid ink areas. A transparency exhibiting sharper density in its images and neatness is thereby attained.

The following examples are given as a specific illustration of the invention. It should be understood, however, that the specific details set forth in the examples are merely illustrative and in nowise limitative. All parts and percentages in the example and the remainder of the specification are by weight unless otherwise specified.

EXAMPLE 1

Two coating formulations were made in accordance with the following recipes, one containing non-volatile organic acid in accordance with the present invention (i.e., glycolic acid), and one without:

| Formulation | A | B |
|---|---|---|
| Dowanol[R] PM | 10 gm. | 10 gm. |
| Ethanol | 10 gm. | 10 gm. |
| Zonyl[R] FSC | 0.12 gm. | 0.12 gm. |
| Joncryl[R] 678 | 0.90 gm. | 0.90 gm. |
| GAF PVP K-90 | 2.10 gm. | 2.10 gm. |
| 67% Glycolic Acid | 0.60 gm. | — |

Dowanol[R] is a registered trademark of the Dow Chemical Co. for the methyl ether of propylene glycol.
Zonyl[R] FSC is a DuPont trademark for a specific cationic fluorosurfactant.
Joncryl[R] 678 is a Johnson Wax Co. trademark for a styrenated acrylic, molecular weight of about 7,000.
GAF PVP K-90 is a GAF trademark for a polyvinyl pyrrolidone of a molecular weight of about 360,000 or more.

Both solutions A and B were coated onto an ICI 505 pretreated polyester base with a wire wound Meyer Rod, and then dried at 200° F. for about 3 minutes in an oven. The resulting clear film on the transparent bases were then cooled to room temperature. A coating of an aqueous-based ink jet ink available from Diconix (a Kodak Company) was then applied to each transparency, air dried, and then examined.

Transparency A having the coating containing the glycolic acid provided a very smooth, even and solid coating of ink jet ink. To the contrary, transparency B, made with the coating formulation containing no glycolic acid, provided an uneven coating of ink jet ink containing numerous voids and small pin holes caused by the ink jet ink coalescing. The advantageous effect of the glycolic acid in the coating formulation is readily apparent. Equivalent results were obtained when the films were printed on a Diconix Dijit 1 continuous ink jet printer.

EXAMPLE 2

A solution of the following was prepared:

| COMPONENT | GMS. |
|---|---|
| Dowanol PM | 100.00 |
| Ethanol | 100.00 |
| Monsanto RF 4506* | 9.00 |
| Degussa Silica OK412 | 0.05 |
| DuPont Zonyl FSC | 1.20 |
| GAF PVP K-90 | 21.00 |
| | 231.25 |

*Monsanto RF 4506 is a styrene/allyl alcohol copolymer.

Increments of 23 Gms. were weighed from the master mix described above, and the following organic acids added:

| | AMT. (GMS) | M.W. | MOLES |
|---|---|---|---|
| 67% Glycolic Acid | 0.60 | 76 | .005 |
| 99% Methoxy Acetic Acid | 0.45 | 90 | .005 |
| Succinic Acid | 0.30 | 118 | 0025 |
| Malic Acid | 0.34 | 134 | .0025 |
| None | — | — | — |

After mixing was completed, the mixes were coated onto ICI 505 pre-bonded polyester base with a No. 24 wire wound rod. The films were then dried for 5 minutes at 220° F. in a convection oven. After cooling, the coated films were then overcoated with the ink used in a Diconix Dijit 1 ink jet printer using a No. 12 wire wound rod. Excellent ink spread was obtained with the films incorporating the organic acids. The film without organic acid showed many voids and repellencies and the ink drew back onto itself.

EXAMPLE 3

A solution of the following was prepared:

| Component | Amt. (Gms) | Function |
|---|---|---|
| Ethanol | 100.00 | solvent |
| Dowanol PM | 100.00 | solvent |
| Joncryl 678 | 9.00 | water insoluble polymer |
| Zonyl FSC | 1.20 | Fluorosurfactant |
| Catanac SN | 4.00 | Antistat agent |
| 67% Glycolic Acid | 6.00 | Ink spread |
| PVP K-90 | 2.30 | Water soluble polymer |
| Degussa Silica OK412 | 0.05 | Anti-blocking agent |

CATANAC[R] SN is an antistatic agent supplied by American Cyanamid Co.
DEGUSSA SILICA OK412 is a hydrocarbon treated silica by Degussa Corp.

The solution was coated onto a 2.75 thick ICI 505 prebonded base using a #23 wirewound rod and dried 5 minutes at 220° F. A coating thickness of 0.25 mils was obtained. The film was coated in the same manner on the opposite side. When printed on a Diconix Dijit 1 continuous Ink Jet Printer using aqueous inks, exellent high resolution images were obtained with no ink draw-back or voids in the solid fill areas. In addition, no substrate cracking took place after the inks had dried. Substitution of the glycolic acid with citric acid, tartaric acid, or malonic acid would result in similar high quality prints.

COMPARATIVE EXAMPLE 1

A mixture of 16 gm. of 10% VINOL 325 and 34 gm. of 10% PVP K-90 in accordance with Example 4 of U.S. Pat. No. 4,503,111 was coated onto a ICI 505 polyester base and dried. A coating of Diconix "Dijit 1" ink was aplied with a No. 12 wire wound rod. ALthough the ink spread and dried well, when the water evaporated from the inked area, the substrate shrank and exhibited large cracks.

COMPARATIVE EXAMPLE 2

All of the formulations of the examples of U.S. Pat. Nos. 4,474,850 and 4,528,242 were coated according to the procedure described therein.

A coating of Diconix "Dijit 1" ink was applied to each with a No. 12 wire wound rod. The ink did not spread well, drew back on itself, and many voids and repellencies were apparent.

To the formulations of examples No. 3 and No. 6 in U.S. Pat. No. 4,528,742 (with the smaller amount of Carbowax 20M) was added 12% malonic acid by weight of polymer. A coating of Diconix ink was applied as described above. In both cases the ink spread very well without voids or drawing back on itself However when the inks dried, some substrate cracking took place in both examples.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An ink jet recording transparency exhibiting improved wetting properties, thereby resulting in an even surface distribution of ink on the transparency, comprising:

(a) a substantially transparent resinous support, and
(b) a substantially clear resin based coating thereon which comprises a water soluble resin, a water insoluble resin, a fluorosurfactant and non-volatile organic acid comprised of:
(i) a glycolic acid or methoxy acetic acid;
(11) a dibasic carboxylic acid having no more than 2 methylene bridges between the two carboxy groups; or
(iii) a tribasic carboxylic acid.

2. The ink jet transparency of claim 1, wherein the resinous support is a transparent polyester film.

3. The ink jet transparency of claim 1, wherein the clear coating contains from about 5 to about 40 weight percent of the acid as based upon the amount of resin component in the coating.

4. The ink jet transparency of claim 1, wherein the water soluble resin is polyvinyl pyrrolidone, polyacrylic acid, polyvinyl pyrrolidone/polyvinyl acetate copolymer, polyacrylamides, hydroxyethylcellulose or carboxymethylcellulose.

5. The ink jet transparency of claim 1, wherein the water insoluble resin is a styrenated acrylic, styrene/allyl alcohol copolymer, nitrocellulose polymer, carboxylated resin, polyester resin, polyketone resin or polyvinyl butyral resin.

6. The ink jet transparency of claim 1, wherein the fluorosurfactant is of the formula $$R_fCH_2CH_2SCH_2CH_2N^+(CH_3)_3CH_3SO_4^-$$

or $$(R_fCH_2CH_2O)_{1,2}P(O)(ONH_4)_{2,1}$$

wherein $R_f = F(CF_2CF_2)_{3-8}$ in each instance.

7. The ink jet recording transparency of claim 1, wherein the non-volatile organic acid is glycolic acid.

8. The ink jet recording transparency of claim 7, wherein the amount of non-volatile organic acid in the clear coating is in the range from about 5 to about 40 weight percent based upon the amount of resin in the coating.

9. The ink jet recording transparency of claim 7, wherein the amount of non-volatile organic acid in the clear coating is in the range of from about 10 to about 30 weight percent based upon the amount of resin in the coating.

10. An ink jet transparency exhibiting improved wetting properties, thereby resulting in an even surface distribution of ink on the transparency, comprising:

(a) a substantially transparent resinous support, and
(b) a substantially clear resin based coating thereon which comprises a water soluble resin, a water insoluble resin, a fluorosurfactant, and at least one of the glycolic acid, citric acid, malonic acid, tartaric acid, malic acid, maleic acid, fumaric acid, succinic acid, methoxy acetic acid, oxalic acid, tartaric acid, or 5-sulfosalicyclic acid.

11. The ink jet recording transparency of claim 10, wherein the resinous support is a transparent polyester film.

12. The ink jet transparency of claim 10, wherein the water soluble resin is polyvinyl pyrrolidone, polyacrylic acid, polyvinyl pyrrolidone/polyvinyl acetate copolymer, polyacrylamide, hydroxyethylcellulose or carboxymethylcellulose.

13. The ink jet transparency of claim 10, wherein the water insoluble resin is a styrenated acrylic, styrene/allyl alcohol copolyemr, nitrocellulose polymer, carboxylated resin, polyester resin, polyketone resin or polyvinyl butyral resin.

14. The ink jet transparency of claim 10, wherein the fluorosurfactant is of the formula $$R_fCH_2CH_2SCH_2CH_2N^+(CH_3)_3CH_3SO_4^-$$

ps or $$(R_fCH_2CH_2O)_{1,2}P(O)(ONH_4)_{2,1}$$

wherein $R_f = F(CF_2CF_2)_{3\text{-}8}$ in each instance.

* * * * *